United States Patent [19]
Rokowski et al.

[11] Patent Number: 5,527,619
[45] Date of Patent: Jun. 18, 1996

[54] TANNIN STAIN BLOCKING COATED SUBSTRATE

[75] Inventors: Joseph M. Rokowski, Riegelsville; Kenneth M. Donnelly, Bensalem; Robert R. Kuhn, Lansdale, all of Pa.

[73] Assignee: Rohm and Haas Company, Philadelphia, Pa.

[21] Appl. No.: 210,349

[22] Filed: Mar. 23, 1994

Related U.S. Application Data

[63] Continuation-in-part of Ser. No. 53,071, Apr. 26, 1993, abandoned.

[51] Int. Cl.⁶ .............................. B32B 9/06; B32B 21/04
[52] U.S. Cl. .................. 428/452; 428/537.1; 428/541; 428/907; 427/397; 427/440
[58] Field of Search ................................ 428/452, 537.1, 428/541, 907; 427/397, 440; 260/2 EN

[56] References Cited

U.S. PATENT DOCUMENTS

| | | |
|---|---|---|
| 2,980,652 | 4/1961 | Melamed . |
| 4,075,394 | 2/1978 | Meyer . |
| 4,218,516 | 8/1980 | Meyer et al. . |
| 4,599,417 | 7/1986 | Sekmakas et al. . |
| 4,732,817 | 3/1988 | Lotz et al. . |
| 4,777,265 | 10/1988 | Merger et al. . |
| 5,051,283 | 9/1991 | Beane et al. . |
| 5,141,784 | 8/1992 | Beane et al. . |

FOREIGN PATENT DOCUMENTS

| | | |
|---|---|---|
| 544569 | 11/1992 | European Pat. Off. . |
| 149517 | 8/1985 | Japan . |
| 364305 | 3/1991 | Japan . |
| 3224701 | 10/1991 | Japan . |
| 9214788 | 1/1992 | WIPO . |

*Primary Examiner*—P. C. Sluby
*Attorney, Agent, or Firm*—David T. Banchik

[57] ABSTRACT

A method of improving tannin stain blocking in a tannin-containing substrate is disclosed which involves applying to the substrate a blend of:

(a) an acid-functional polymer formed from about 0.1% by weight to about 20% by weight, based on the total weight of said polymer, of at least one acid-functional monomer; and (b) about 0.1% by weight to about 20% by weight, based on the weight of said acid-functional polymer, of at least one organosilane having a number average molecular weight of from about 100 to about 10,000.

A method of improving the physical properties of the coating composition, including viscosity, adhesion, scrub resistance, water whitening resistance, corrosion resistance, hot block resistance and water, fire, smoke, nicotine, pen and ink stain blocking is also disclosed.

7 Claims, No Drawings

5,527,619

TANNIN STAIN BLOCKING COATED SUBSTRATE

This application is a continuation-in-part application of Ser. No. 08/053,017, filed on Apr. 26, 1993, abandoned.

FIELD OF THE INVENTION

This invention relates to a method of treating a substrate and, more particularly, to a method of treating tannin-containing wood substrates with an organosilane-modified coating composition to improve the quality of subsequently applied water-based coatings. This improvement in tannin stain blocking is accompanied by unanticipated improvements in physical properties, such as, for example, adhesion; scrub resistance; water whitening resistance; corrosion resistance; hot block resistance; and water, fire, smoke, nicotine, pen and ink stain blocking.

BACKGROUND OF THE INVENTION

Significant research efforts have been devoted toward the development of water-based emulsion coatings as replacements for the solvent-based coating formulations for use in industrial and architectural applications. However, water-based coatings have found somewhat limited acceptance in wood finishing operations. The use of water-based coatings is generally known to those in the coatings industry to have at least two disadvantages over solvent-based coatings: water-soluble chromophoric compounds, such as tannin, on and in the wood surface bleed through the applied water-based coatings to stain, discolor and detract from the resulting finish quality; and, when applied under and exposed to certain environmental conditions, physical properties such as scrub resistance, water whitening resistance, corrosion resistance, hot block resistance; and fire, smoke, nicotine, pen and ink stain blocking and adhesion of the water-based coating to the wood substrate can be a problem.

In an attempt to improve the tannin stain blocking of water-based coatings, reactive pigments have been incorporated into the coating. Although reactive pigments are generally effective tannin stain blocking agents, they, however, have limitations. Reactive pigments can cause stability problems, such as viscosity increase and polymer gelation, and are known to be environmentally unfriendly.

What is required is a method for blocking tannin stains in coatings applied to tannin-containing substrates, such as, for example, wood, cardboard, paper, wood compositon particle board, Masonite, and the like, that is effective without the use of either volatile organic solvents or reactive pigments.

What has been found is a novel method for employing an organosilane-modified composition for the purpose of improving tannin stain blocking in coating compositions over tannin-containing substrates. There are several advantages of the method of the invention:

(1) It reduces the leaching of water-soluble chromophoric compounds, on or in the wood or other tannin-containing substrate surface, especially the highly concentrated tannins found in wood knots, from bleeding through a subsequently applied water-based finish;

(2) It provides a water-based wood finishing composition and process that is equal in tannin stain blocking performance to solvent-based and reactive pigment containing systems;

(3) It provides a water-based unpigmented coating which is generally, coalescent-free, solvent-free and contains low levels of volatile organic compounds (VOCs) when compared to solvent based coatings.

This improvement in tannin stain blocking produced by the method of the invention is accompanied by unexpected improvements in physical properties, including reduced viscosity; chalk, alkyd and weathered wood adhesion; scrub resistance, water whitening resistance, corrosion resistance, hot block resistance; and water, fire, smoke, nicotine, pen and ink stain blocking.

The organosilane-modified coating useful in the method of this invention may be substituted for water-based and solvent-based coatings, as well as coatings containing reactive pigments such as, for example, zinc oxide and barium metaborate.

PRIOR RELATED ART

Although several systems for inhibiting tannin migration in tannin-containing wood substrates are known, none use or suggest the use of an aminosilane-modified coating as an effective tannin stain blocking agent. Further, none show an unexpected improvement in water whitening resistance, adhesion, corrosion and blister resistance. For example, U.S. Pat. No. 5,141,784 discloses a process for treating wooden substrates having leachable chromophoric substances by applying an effective amount of a carboxylic acid salt and/or a water soluble organic compound bearing one or more salt-forming amine groups and having a molecular weight of about 50 to about 300,000.

U.S. Pat. No. 5,051,283 discloses a surface treating composition for wooden surfaces that inhibits leachable compositions from staining after-applied water-base coating comprising about 1% to about 25% by weight of an alkali metal salt of a monobasic or dibasic carboxylic acid and about 1% to about 50% by weight of a water soluble organic compound bearing one or more salt-forming amine groups and having a molecular weight of about 50 to about 300,000 and from about 25% to about 98% water.

U.S. Pat. No. 4,075,394 discloses a process of treating tannin-containing wood substrates with an aqueous solution of a polyalkylenamine.

International Application Number PCT/US/00643 discloses a polymeric composition containing at least one acid-functional vinyl polymer and at least one amino-functional siloxane polymer. The blended polymeric compositions are able to provide various substrates with surface coatings that are characterized as quasi-crosslinked, alkali-soluble polymeric networks exhibiting enhanced surface properties. Also disclosed are methods of producing the blended polymeric composition.

Japanese Patent Application J 03-064305A discloses a composition consisting of a carboxyl-group-containing, water-soluble resin, macromolecular aqueous dispersion and water-soluble silane coupling agent containing an amino group in the molecule in which the carboxyl-group containing, water soluble resin has an acid value of 30–800 and the amounts per 100 solid weight parts of the macromolecular aqueous dispersion of 0.2–2.0 weight parts of the aqueous resin and 0.1–3 weight parts of the amino-group containing silane coupling agent are compounded.

SUMMARY OF THE INVENTION

This invention is directed to a method of improving tannin stain blocking in a tannin-containing substrate which comprises applying to the substrate a blend of:

(1) an acid-functional polymer formed from about 0.1% by weight to about 20% by weight, based on the total weight of said polymer, of at least one acid-functional monomer; and (2) 0.1% to about 20% by weight, based on the weight of the polymer, of an organosilane, wherein the acid-functional polymer has an acid level from about 0.1% to about 20% and wherein the organosilane has a molecular weight of from about 100 to about 10,000.

This invention is also directed to a method of improving the physical properties of a coating, including viscosity, adhesion, scrub resistance, water whitening resistance, corrosion resistance, hot block resistance and water, fire, smoke, nicotine, pen and ink stain blocking.

DETAILED DESCRIPTION OF THE INVENTION

What has been found to be novel and unexpected is a method for improving tannin stain blocking in tannin-containing substrates by applying a blend of:

(1) an acid-functional polymer formed from about 0.1% by weight to about 20% by weight, based on the total weight of said polymer, of at least one acid-functional monomer; and (2) 0.1% to about 20% by weight, based on the weight of the polymer, of an organosilane, wherein the acid-functional polymer has an acid level from about 0.1% to about 20% and wherein the organosilane has a molecular weight of from about 100 to about 10,000.

Tannin-containing substrates include paper, cardboard, plywood, particle board, chip board, strand board, Masonite and the like.

This invention relates to a method of improving the tannin stain blocking and other properties of the coating by the addition of an least one organosilane to acid-functional polymers. Organosilanes generally have not found broad-base use in water-based coatings because of their excessive reactivity, insolubility and instability in aqueous and/or pigmented systems. In the aqueous-based system of the present invention, the excessive reactivity of organosilanes are exploited. It is believed that the combination of the reactive aminosilane with an acid-functional polymer creates a coating that effectively prevents tannin stains from migrating into after-applied water-based finishes. However, this is a theory of the present invention and should not be considered to in any way whatsoever to limit the scope of such. The tannin stain blocking system of the present invention also shows an unexpected improvements in physical properties of the aminosilane modified coating composition.

The compositions useful in the method of the present invention are prepared by adding an effective amount of an organosilane to an acid-functional polymer. The quantity of organosilane that is added to the polymer is a function of the acid content of the polymer. When the acid level of the acid-functional polymer is from about 0.1% by weight to about 5% by weight, based on the weight of the polymer, the level of organosilane to modify the acid-functional polymer is from about 0.1% to about 5%. When the acid level of the acid-functional is from about 5% by weight to about 20% by weight, based on the weight of the weight of the polymer, the level of organosilane to modify the acid-functional polymer is from about 5% to about 20%.

Preferably the acid level in the acid-functional polymer is from about 0.1% to about 10%, more preferably, from about 0.1% to about 5%. The preferred level of organosilane to modify the acid-functional polymer is from about 0.1% to about 10%, more preferably, from about 0.1% to about 5%, based on the weight of the polymer.

If insufficient organosilane is used in relation to the acid-functional polymer, properties such as, for example, water whitening resistance of the dried unpigmented coating can be compromised and tannin stain blocking may not be optimized. Whereas, on the other hand, if too high a level of aminosilane is used in relation to the acid-functional vinyl polymer to achieve effective tannin stain blocking, the excess organosilane may adversely affect the properties of the coating, such for, example adhesion, water sensitivity, corrosion and blister resistance.

Organosilanes of various molecular weights may be used to modify the acid-functional vinyl polymer in the practice of this invention. Preferably, however, the organosilanes have an number average molecular weight, as determined by gel permeation chromatography, is from about 100 to about 10,000, more preferably from about 150 to about 5000, and most preferably from about 150 to about 1000. Practical considerations, such as solubility, mechanical application, and the like, are generally the only limitations upon the molecular weight. Although for convenience purposes, it is most preferred that the molecular weight does not exceed a maximum of about 1000.

In general, organosilanes are organic materials containing silicone. Organosilanes found to be effective modifiers of acid-functional polymers for improved tannin stain blocking in unpigmented and pigmented water-based coatings include aminosilanes, such as trimethoxysilylpropyldiethyl-enetriamine, N-methylaminopropyltrimethoxy-silane, aminoethylaminopropylmethyl dimethoxysilane, aminoethylaminopropyl trimethoxysilane (Dow Corning Z-6020), aminopropyl methyldimethoxysilane, aminopropyltrimethoxysilane, polymeric aminoalkylsilicone, aminoethylaminoethylaminopropyl-trimethoxysilane, N-methylaminopropyl-trimethoxysilane, methylaminopropyltrimethoxysilane; quaternary aminosilanes; epoxy silanes; mercaptosilanes; vinylsilanes, methacryloxysilanes; and the like. Aminosilanes are preferred.

In the practice of the invention, organosilane-modified coatings are prepared by adding a specific quantity of organosilane to an acid-containing polymer. The quantity of organosilane added should be in specific proportion, for reasons stated earlier, to the acid content of the polymer. The organosilane is preferably added after the polymerization of the polymer. The organosilane may, however, also be added during the polymerization.

The acid-containing polymer useful in the method of the invention may be prepared via any processes known in the art, such as, for example, by emulsion polymerization. The monomers used in the preparation of the polymers consist wholly or largely of monomers which do not contain any reactive groups other than the ethylenic unsaturation. Examples of the monomers are the alkyl(meth)acrylates, styrene and vinyl esters of carboxylic acids such as hydroxyethyl acrylate, hydroxyethyl methacrylate, hydroxypropyl methacrylate, ethylene glycol-monoallylether, glycidyl acrylate, glycidyl methacrylate, allyl glycidyl ether and the like.

It is also possible to use monomers in relative small amounts, such as for example, between 0.1% and 10% by weight, which, in addition to the ethylenic unsaturation, may also contain other reactive groups, hydroxyl groups, alkoxymethyl amide groups, such as for example, N-methylolacrylamide, N-methylolmethacrylamide, n-butoxymethyl acrylamide, n-butoxymethyl methacrylamide, or epoxy groups, and the like.

Acid functionality is usually, but not in all instances, limited to the use of acid-functional monomers such as for examples acrylic acid, methacrylic acid fumaric acid, maleic acid, crotonic acid, itaconic acid, phosphoric acid esters of hydroxyethyl-(meth)acrylate acrylamidopropansulphonic acid, and vinylsulphonic acid. Preferably, acrylic acid, methacrylic acid, itaconic acid and mixtures thereof are used as monomer units containing acid groups in the practice of this invention.

Also useful in the preparation of acid-functional polymers of the present invention, in amounts from about 1% to about 10% by weight, are alkylenically polyunsaturated monomers, such as triallyl cyanurate, divinyl maleate, divinyl adipate, vinylcrotonate and ethylene glycol diacrylate ester, allyl methacrylate and the like.

As initiator systems for the polymerization of the ethylenically unsaturated monomers. Examples of suitable types of initiators are persulphates, hydrogen peroxides, organic peroxides, such as hydroperoxides and azo compounds, whether or not in combination with reductants. Depending on the nature of the monomers and on the desired properties of the polymer and on the desired size of the polymer particles, various kinds of emulsifiers can be used either separately or in combination. Generally both anionic and non-ionic emulsifiers can be used. Optionally, protective colloids can also be used. In many cases, a mixture of an anionic and a non-ionic emulsifier is the most satisfactory. A few examples of suitable classes of compounds available for use in the polymerization are alkylbenzenesulphonates and alkyl ($C_{10}$–$C_{18}$) sulfates, monodiakylphosphates, ($C_{10}$–$C_{18}$) fatty acid salts, polyglycolethers of ($C_8$–$C_{18}$) alcohols or alkylphenols and block copolymers of ethylene oxide and propylene oxide.

An emulsifier or combination of emulsifiers may be used in the polymerization process. The amount used depends on the type of monomer and on the type of emulsifier. Generally, an amount form about 0.1% to about 10% by weight is used, more specifically an amount form about 0.5% to about 5% by weight, based on the total amount of solid.

The polymerization can also be effected by first producing a preemulsion of the monomers and a part of the total amount of water and emulsifiers and subsequently starting the polymerization with the aid of a catalyst whereas the metering time of the pre-emulsion and the catalyst is between 2 and about 5 hours. On the other hand, it is possible to first polymerize part of the monomers in emulsion and to add more monomers stepwise, separately or mixed. In addition, it is possible to first polymerize a monomer or a combination of monomers of a certain type and to subsequently add other monomers or combinations of monomers, so that polymer particles with a laminated structure are formed. The concentration of acid groups can be different for each layer, for instance, with a high concentration of acid groups on the outside of the particle and a low concentration in the center of the particle. The amount of acid required may then be less than 2.0% by weight, for example, between 0.5 and 1.0 percent by weight, based on the total polymer. The reaction temperature during the polymerization may be between −15° C. and 100° C., preferably between 20° C. and 90° C.

During the polymerization, other compounds may also be present, for instance, chain length regulators, such as mercaptans, and buffers, such as sodium bicarbonate. In addition, substances like plasticizers, crosslinking agents, flow-promoting agents, thickeners, colorants or pigments, including inorganic and polymeric pigments, may be present during the polymerization or be added after the polymerization. Also, adhesion promoting monomers, such as disclosed and prepared in accordance with U.S. Pat. Nos. 2,980,652; 4,1599,417 and 4,777,265, and by this reference incorporated herein, may be present during polymerization of the acid-functional polymer.

Where polymers are polymerized using surfactants, such as for example, sodium lauryl sulfate, and the like, it may be necessary to add additional surfactant to allow for the incorporation of the organosilane in order to provide stability to the modified acid-functional polymer. The level of surfactant used is from about 0.1% to about 10% by weight, based on the weight of the emulsion polymer.

The following non-limiting examples are provided to further illustrate the organosilane-modified coatings prepared according to the present invention and useful in tannin stain blocking systems, as well as the unexpected improvement in other physical properties such as, for example, viscosity, adhesion, scrub resistance, water whitening resistance, corrosion resistance, hot block resistance and water, fire, smoke, nicotine, pen and ink stain blocking. These examples are intended to be illustrative of the present invention and are no way intended to limit the scope of such except as further delineated in the claims.

Test Method for Tannin Stain Blocking

Tannins and other chromophoric extractives are naturally occurring materials occurring in wood-based products. These chromophoric materials are present in Western Red Cedar, Redwood Oak, and, White and Yellow Pine. They are also present in wood composition products such as paper, cardboard, plywood, particle board, chip board, strand board and Masonite.

Staining substrates such as dark-staining cedar and Redwood are used in this test and are planed and sanded. Boards are chosen with a consistent grain pattern across the length of the board to avoid variability in the test. The test panel is divided into equal sections. Test primers are applied by brush to equal spread rate (i.e. approximately 450 square feet per gallon determined by weighing of the test paint) and allowed to dry. A high-hiding topcoat paint, which permits the passage of tannins, is then applied to the entire panel, also at 450 square feet per gallon. The topcoat is then immediately placed in a sealable, 12 cubic foot humidity chamber to which has been added three gallons of 35°–45° C. water. The panel is supported three inches above the water, face-up, and allowed to remain in the high humidity chamber for 16 hours. It is then removed from the high humidity box, and allowed to dry for at least 16 hours. The panel is then rated for tannin stain blocking.

A water-based tannin stain blocking pigmented primer paint, (19.5% pigment volume concentration; 37.4% volume solids) was used as a control, in all examples which contain aminosilane-modified pigmented coatings.

Calculation of Results

Tannin stain blocking can be measured in three ways:

(1) Qualitatively on a scale of 1 to 10 by assigning the coating a rating of 10 (100% tannin blocking) to a rating of 1 (10% tannin blocking). In this method of judging tannin stain blocking, 2.0 units are considered significantly different.

(2) Spectrophotometrically by readings taken with a Minolta Data Processor DP-100. Less-positive 'b' values of an Lab reading indicate better tannin stain blocking performance, than more positive 'b' values. In this method of judging tannin stain blocking, 0.4 units are considered significantly different.

(3) Comparatively by comparing the measured 'b' values of an experimental primer that is topcoated with the 'b' value of the fail control. This is particularly useful when the staining substrate is very rich in tannins and other chromophoric material. In this method, the formula for percent tannin stain blocking is listed below.

% Stain Blocking=$10+[b_{fail}-b_{experimental}/(b_{fail}/90)]$ where $b_{fail}$='b' value of the fail control $b_{experimental}$='b' value of the topcoated experimental primer.

This assumes that the fail control, in two coats (one as primer, one as topcoat) has only 10% tannin stain blocking over dark staining woods. Thus if 'b' values of experimental paints have negative values, it is possible to have tannin stain blocking in excess of 100%, suggesting that particular coating could potentially block even more tannin stains if the test panel had more severe tannin. In cases where the primers actually hurt tannin stain blocking, then the percent blocking value can be in negative numbers.

The following abbreviations are used in the examples:

| | |
|---|---|
| MMA | methyl methacrylate |
| BA | butyl acrylate |
| MAA | methacrylic acid |
| 2-EHA | 2-ethylhexyl acrylate |

Test Results

Example 1—Tannin Stain Blocking in Clearcoats

An unpigmented emulsion sample was modified with various amounts of aminoethylaminopropyltrimethoxysilane (Z-6020) and tested for tannin stain blocking. The emulsion composition is 51 BA/45.5 MMA/2.5 MAA/1.0 adhesion monomer.

| Sample ID | Description | Cedar 'b' Value | Redwood 'b' value |
|---|---|---|---|
| A | Control 0% Z-6020 | +5.5 | +5.5 |
| B | 1% Z-6020 | +2.5 | +3.2 |
| C | 2% Z-6020 | +1.5 | +2.0 |
| D | 3% Z-6020 | +0.9 | +1.4 |

The addition of aminoethylaminopropyltrimethoxysilane (Z-6020) improves tannin stain blocking of unpigmented clearcoats as evidenced by a decrease in 'b' value.

Example 2—Tannin Stain Blocking of Paints

Pigmented paint samples were modified with various amounts of aminoethylaminopropyltrimethoxysilane (Z-6020) and tested for tannin stain blocking. The emulsion composition is 51 BA/45.5 MMA/2.5 MAA/1% adhesion monomer. The paint formulation is 19.5% pigment volume concentration and 37.4% volume solids.

| Sample ID | Description | Cedar 'b' Value |
|---|---|---|
| A | Control 0% Z-6020 | +0.5 |
| B | 1% Z-6020 | −0.4 |
| C | 2% Z-6020 | −1.0 |
| D | 3% Z-6020 | −1.2 |

The addition of aminoethylaminopropyltrimethoxysilane (Z-6020) improved tannin stain blocking of paints as evidenced by a decrease in 'b' value.

Example 3—Tannin Stain Blocking of Paints

Pigmented paint samples were modified with 1% aminoethylaminopropyltrimethoxysilane (Z-6020) and tested for tannin stain blocking. The polymer composition is same as in Example 1. The paint formulation is the same as Example 2.

| Sample ID | Description | Cedar 'b' Value |
|---|---|---|
| A | Control 0% Z-6020 | +2.6 |
| B | 1% Z-6020 | +0.2 |

The addition of aminoethylaminopropyltrimethoxysilane (Z-6020) improves tannin stain blocking of paints as evidenced by a decrease in 'b' value.

Example 4—Blister Resistance of Modified Paints on Various Substrates

Water-based primer paints (19.5% pigment volume concentration and 37.4% volume solids) were prepared from a 52 BA/46 MMA/1.5 MAA polymer and were modified with the following additives: Versamine A-50 (aliphatic adduct of diethylene triamine), sodium acetate, aminoethylaminopropyltrimethoxysilane (Z-6020 from Dow Corning). Use levels are 1.5% active material on total paint weight.

Blister Rating Method:

Numerical rating applies to the size of the blisters: 10=no blisters, 9 is the smallest and 1 is the largest. Non-numerical ratings apply to the density of the blisters progressing from:

low density or few ("F")

medium ("M")

medium dense ("MD")

high density or dense ("D")

| | | Wet Blister Resistance | | |
|---|---|---|---|---|
| Sample ID | Description | Alkyd Paint | Chalky Latex | Chalky Oil |
| A | Control | 10 | 10 | 10 |
| B | Aliphatic adduct of diethylene triamine | 9F | 7D | 10 |
| C | Sodium Acetate | 9D | 6D | 7D |
| D | Aliphatic adduct of diethylene triamine & sodium acetate | 6D | 6D | 10 |
| E | Z-6020 | 10 | 10 | 10 |

The use of aminoethylaminopropyltrimethoxysilane (Z-6020) did not effect blister resistance while the use of aliphatic adduct of diethylene triamine and/or sodium acetate hurts blister resistance.

Example 5—Force to Peel Adhesion of Modified Paints on Various Substrates

Painting Procedure:

An initial coat of paint was applied to the substrate at a weight of 2.5 grams of coating per 11 square inches. A 2-inch section of 4-ply cheesecloth was then placed flatly on the initial coat of paint. A second application of 5.0 grams of paint was then applied on top of the paint saturated cheesecloth as evenly as possible. The panel was then allowed to dry for one week. A one inch wide strip was then scored into the cheesecloth over each of the test sites. It was then exposed for one hour in a water spray box and then removed. The panel was then supported horizontally and a weight holder attached to one end of the cheesecloth. Various weights (grams) were applied to achieve a constant rate of pull (i.e. approximately ⅜ inch per five seconds). Higher values demonstrate better adhesion.

| Sample ID | Description | Alkyd Paint | Chalky Latex Paint | Chalky Oil Paint |
|---|---|---|---|---|
| A | Control | 50 grams | 350 | 150 |
| B | Aliphatic adduct of diethylene triamine | 50 | 300 | 50 |
| C | Sodium acetate | 50 | 150 | 50 |
| D | Aliphatic adduct of diethylene triamine and sodium Acetate | 50 | 150 | 50 |
| E | Z-6020 | 300 | 700 | 350 |

Paints modified with aminoethylaminopropyl-trimethoxysilane (Z-6020) have improved adhesion compared to either unmodified paints or paints modified with aliphatic adduct of diethylene triamine and/or sodium acetate.

Example 6—Tannin Stain Blocking of Unpigmented Primers on Cedar

The polymer composition is as in Example 1.

| Sample ID | Description | 'b' Value | % Tannin Stain Blocking |
|---|---|---|---|
| A | Control | 5.8 | 29 |
| B | 3% Z-6020 | −0.8 | 109 |
| C | 3% Aliphatic adduct of diethylene triamine | 4.2 | 48 |

Unpigmented clear coats modified with aminoethylaminopropyltrimethoxysilane (Z-6020) have improved tannin stain blocking versus an unmodified control or an aliphatic adduct of diethylene triamine-modified coating.

Example 7—Tannin Stain Blocking of Modified Unpigmented Primers (on Cedar or Redwood)

The emulsion used for Control #1 is 51.5 BA/46.0 MMA/2.5 MAA/0–5% adhesion promoter where adhesion promoter is substituted for some combination of the monomers; the emulsion polymer used in Control #2 is 51.6 BA/47.1 MMA/1.3 MAA/0–5% adhesion monomer where adhesion monomer is substituted for some combination of the monomers.

| Sample ID | Description | Trial 1 'b' Val/% Block | Trial 2 'b' Val/% Block |
|---|---|---|---|
| A | Control #1 | 5.3/29 | 5.6/35 |
| B | 3% Z-6020 | 0.4/54 | 1.7/80 |
| C | 3% Versamine A50 | 6.7/10 | 5.3/39 |
| D | Control #2 | 3.7/51 | 5.2/30 |
| E | 3% Z-6020 | −1.0/113 | −0.9/110 |

Unpigmented primers modified with aminoethylaminopropyltrimethoxysilane (Z-6020) have better tannin stain blocking than unmodified or aliphatic adduct of diethylene triamine modified coatings as evidenced by reduced 'b' values and increased percent tannin blocking.

Example 8–Blister Resistance of Modified Paints on Various Substrates

Rating Method:
Numerical rating applies to the size of the blisters: 10=no blisters, 9 is the smallest blister and 1 is the largest blister. Non-numerical ratings apply to the density of the blisters progressing from:
low density or few ("F")
medium ("M")
medium dense ("MD")
high density or dense ("D")

Blister Resistance of Modified Paints

| Sample ID | Description | Alkyd Paint | Chalky Latex Paint | Chalky Oil Paint |
|---|---|---|---|---|
| A | Control #1 | 10 | 7D | 8MD |
| B | 1.5% Z-6020 | 10 | 5D | 8MD |
| C | 1.5% Versamine A-50 | Fail | Fail | Fail |
| D | 1.5% Wacker F-756* | Fail | Fail | Fail |

*Wacker F-756 - silicone fluid characterized as an alkylene di-amino functional polydimethyl siloxane fluid having a molecular weight of about 1350.

The polymer composition is the same as Example 7, Control 2. The paint formulation is the same as Example 2.

Samples C and D—Blisters could not be rated because of poor film integrity.

Modification of paints with aminoethylaminopropyltrimethoxysilane (Z-6020) has some effect on blister resistance, while modification of paints with aliphatic adduct of diethylene triamine and Wacker F-756 caused swelling of the entire paint film.

Example 9—Force to Peel Adhesion of Modified Paints

| Sample ID | Description | Alkyd Paint | Chalky Latex Paint | Chalky Oil Paint |
|---|---|---|---|---|
| A | Control #1 | 250 grams | 400 | 750 |
| B | 1.5% Z-6020 | 1500 | 1050 | 350 |
| C | 1.5% Aliphatic adduct of diethylene triamine | 150 | 400 | 900 |
| D | 1.5% Wacker F756 | 400 | 700 | 400 |

Additives at 1.5% on total paint weight.
Modification of paints with aminoethylaminopropyltrimethoxysilane (Z-6020) improves adhesion properties.
Rating Method:
The quantity of weight to achieve a constant rate of pull was used to determine adhesion performance where high numbers are best.

Example 10—Tannin Stain Blocking of Modified Unpigmented Clearcoats

| Sample ID | Description | 'b' Value | % Tannin Stain Block |
|---|---|---|---|
| A | Control #1 | 5.8 | 29 |
| B | Z-6020 | −0.8 | 109 |
| C | Aliphatic adduct of diethylene triamine | 4.2 | 48 |
| D | Wacker F756 | −0.2 | 102 |

Wacker F756 modified coatings film quality was poor.

Example 11—Tannin Stain Blocking of Modified Unpigmented Clears

| Sample ID | Description | Cedar % Block | Redwood % Block |
|---|---|---|---|
| A | Control #2 | 50 | 45 |
| B | Z-6020 unpigmented | 119 | 101 |
| C | Aliphatic adduct of diethylene triamine unpigmented | 65 | 31 |
| D | Wacker F756 unpigmented | 76 | 63 |

Use levels are 1.3% on total weight.

Example 12—Water Whitening Resistance of Modified Unpigmented Clears

| Sample ID | Description | Water Whitening Resistance Qualitative 10 = Best | Measure % Whiteness Resistance Highest = Best |
|---|---|---|---|
| A | Control #2 unpigmented | 2 | 50 |
| B | 1.5% Z-6020 | 10 | 119 |
| C | 1.5% aliphatic adduct of diethylene triamine | 2 | 65 |
| D | 1.5% Wacker F756 | 5 | 76 |
| E | 3.0% Z-6020 | 7.5 | |
| F | 3.0% aliphatic adduct of diethylene triamine | 3 | 10 |
| G | 3.0% Wacker F-756 | 4 | 106 |
|   | Control #1 unpigmented | 2 | |
| H | 3% Z-6020 | 5 | |
| I | 3% aliphatic adduct of diethylene triamine | 2 | |
| J | 3% Wacker F-756 | 1 | |

Use levels are active material on binder solids (or 1.3% on total weight).

Example 13—Clearcoats for Tannin Stain Blocking Over Red Oak Plywood

| Description | B Value | % Tannin Stain Blocking |
|---|---|---|
| Control #1 unpigmented | 5.2 | 13 |
| 3% Z-6020 | 4.7 | 22 |
| Control #2 unpigmented + 3% Z-6020 | 1.7 | 72 |

Aminoethylaminopropyltrimethoxysilane (Z-6020) levels are active material on binder solids.

Example 14—Corrosion Resistance in Unpigmented Clearcoats

A coating was brush-applied at an equal spread rate of 450 square feet per gallon to a panel with six box nails embedded in each test site. The coating allowed to dry one hour and then topcoated with a standard, pigmented paint. Immediately after topcoating, the panel was then placed in a sealable high-humidity cabinet for 16 hours, removed, dried for 1 day and then rated for nailhead rusting (10=best; 1=worst).

| Sample ID | Description | Rating |
|---|---|---|
| A | Control #1 | 6 |
| B | 1.5% Z-6020 | 10 |
| C | 3.0% Z-6020 | 7.5 |
| D | 3.0% aliphatic adduct of diethylene triamine | 3 |
| E | Control #2 | 5 |
| G | 1.5% Z-6020 | 8 |
| H | 3.0% Z-6020 | 7.5 |
| I | 3.0 aliphatic adduct of diethylene triamine | 5.5 |

Example 15—Fire and Smoke Stain Blocking of Unpigmented Coating

A control coating containing no organosilane and a coating containing aminoethylaminopropyltrimethoxysilane (Z-6020) were brush-applied at an equal spread rate of 450 square feet per gallon to a white pine panel with fire and smoke damage. The coatings were allowed to dry then topcoated with a standard, unpigmented paint. The panel is dried for 1 day and then rated for fire and smoke stain blocking (10=best; 1=worst).

| Sample ID | Description Control | Fire and Smoke Stain Blocking |
|---|---|---|
| A | Control | 8 |
| B | 1.5% Z-6020 | 10 |

Example 16—Tannin Stain Blocking in Clearcoats

An unpigmented polymer sample was modified with various amounts of aminoethylaminopropyltrimethoxysilane (AO-700 from Hüls America) or aminopropylmethyldiethoxysilane (AO-742 from Hüls America) and visually evaluated for tannin stain blocking over knotty pine board. The polymer composition is 52 BA/44.5 MMA/2.5 MAA/1.0 adhesion monomer for Sample ID A–C and the polymer composition is 45.6 BA/52.4 MMA/1.0 MAA/1.0 adhesion monomer for Sample ID D–J.

The samples were prepared by adding the organosilane to the polymer, blended and allowed to equilibrate overnight. One coat of the blend was applied to knotty pine board, dried overnight and then topcoated with a gloss topcoat paint. After drying one week at 25° C. and 50% relative humidity, the coated board was heated in a constant temperature at 40° C. and ambient humidity conditions for up to 8 weeks. The samples were visually rated (0–5) each week for discoloration over the knot areas where 0 is the best.

| Sample ID | Description | Initial | 2 weeks | 4 weeks | 6 weeks | 8 weeks |
|---|---|---|---|---|---|---|
| A | Control 0% organosilane | 0 | 3 | 4–5 | 5 | 5 |
| B | 1% AO-700 | 0 | 0 | 0–1 | 1 | 2 |
| C | 2% AO-700 | 0 | 0 | 0 | 1 | 1 |
| D | Control 0% organosilane | 0 | 4 | 4 | 5 | 5 |
| E | 1% AO-700 | 0 | 0 | 0 | 1 | 1 |
| F | 1% AO-700 | 0 | 0 | 0 | 0–1 | 3 |
| G | 2% AO-700 | 0 | 0 | 0–1 | 1 | 1 |
| H | 2% AO-700 | 0 | 0 | 1 | 2 | 3 |
| I | 1.5% AO-742 | 0 | 0 | 3 | 4 | — |
| J | 3% AO-742 | 0 | 0 | 0 | 0 | 0 |

The addition of aminoethylaminopropyltrimethoxysilane (AO-700 from Hüls America) or aminopropylmethyldiethoxysilane (AO-742 from Hüls America) improved tannin stain blocking of unpigmented clearcoats over knotty wood as compared to the control.

Example 17—Hot Block Resistance

An unpigmented polymer sample was modified with various amounts of aminoethylaminopropyltrimethoxysilane (AO-700 from Hüls America) or aminopropylmethyldiethoxysilane (AO-742 from Hüls America) and evaluated for hot block resistance. The polymer composition is 67(70.2 2-EHA/24.3 MMA/3.5 MAA/2.0 MAA/2.0 adhesion promoter)//33(7.8 2-EHA/87.2 MMA/3.0 MAA/2.0 adhesion promoter).

The samples were prepared by adding the organosilane to the polymer, blended and allowed to equilibrate overnight. One coat of the blend was applied to a panel of 4 inches by 8 inches by ⅛ inches tempered Duron® hardboard and then dried one week at 25° C. and 50% relative humidity. The panel was cut into 4 inch by 2 inch pieces. The pieces were then placed in a cross-wise arrangement face-to-face on a square of 2 inches by 2 inches. The test specimens were blocked with a load of 5 kilograms (1.25 kilograms per square inch) at 50° C. and 70° C. After a short non-loaded period the pieces were separated by hand and rated for sticking and film damage. The test specimens were rated for sticking on a scale of 0–5 where 0=best and rated for film damage by proportion of area damaged where 0%=best.

| Sample ID | Description | 50° C. | 70° C. |
|---|---|---|---|
| A | Control 0% organosilane | 1.5/1% | 4.5/92% |
| B | 3.5% AO-700 | 1/0% | 1.3/4% |
| C | Control 0% organosilane | 2.5/33% | 5/93% |
| D | 1% AO-742 | 2/5% | 4.1/60% |
| E | 3% AO-742 | 1.7/4% | 5/93% |
| F | 5% AO-742 | 1.2/1% | 5/83% |

The addition of aminoethylaminopropyltrimethoxysilane (AO-700 from Hills America) or aminopropylmethyldiethoxysilane (AO-742 from Hüls America) improved hot block resistance as compared to the control.

Example 18—Water Stain Blocking

An unpigmented polymer sample was modified with various amounts of aminoethylaminopropyltrimethoxysilane (Z-6020 from Dow Corning) and evaluated for water stain blocking. The polymer composition is 51.5 BA/46.0 MMA/2.5 MAA/0–5% adhesion promoter.

The samples were prepared by adding first adding and mixing 2% Triton® X-405 surfactant, based on solids on latex solids, to the polymer sample. Then 3% aminoethylaminopropyltrimethoxysilane, based on active ingredient on latex solids, (0% for the control) was added to the mixture and allowed to equilibrate overnight.

One coat of the mixture was applied to a water stained ceiling tile and dried. One or two coats of an interior flat wall paint was then applied as a topcoat and dried. The test specimens were rated for water stain blocking on a scale of 0–10 where 10=best.

| Sample ID | Description | One Coat | Two Coats |
|---|---|---|---|
| A | Control 0% organosilane | 2 | 2 |
| B | 3% Z-6020 | 8 | 7 |

The addition of aminoethylaminopropyltrimethoxysilane (Z-6020) improved water stain blocking as compared to the control.

Example 19- Pen and Ink Stain Blocking

An unpigmented polymer sample was modified with various amounts of aminoethylaminopropyltrimethoxysilane (Z-6020 from Dow Corning) and evaluated for water stain blocking. The polymer composition is 51.5 BA/46.0 MMA/2.5 MAA/0–5% adhesion promoter.

The samples were prepared by adding first adding and mixing Triton® X-405 surfactant, based on solids on latex solids, to the polymer sample. Then 3% aminoethylaminopropyltrimethoxysilane, based on active ingredient on latex solids, (0% for the control) was added to the mixture and allowed to equilibrate overnight.

One coat (7.0 mils draw down) of the mixture was applied to a Leneta 5 C panel which was marked with different pen and ink markings and allowed to dry for two hours. One coat (7.0 mil draw down) of an interior flat wall paint was then applied on top of the first coat and allowed to dry for 24 hours. The test panels were rated for pen and ink stain blocking on a scale of 0–10 where 10=best.

| Sample ID | Description | Trial 1 | Trial 2 |
|---|---|---|---|
| A | Control 0% organosilane | 2.7 | 1 |
| B | 3% Z-6020 | 4.7 | 8 |

The addition of aminoethylaminopropyltrimethoxysilane (Z-6020) improved pen and ink stain blocking as compared to the control.

Example 20— Nicotine and Smoke Stain Blocking

An unpigmented polymer sample was modified with various amounts of aminoethylaminopropyltrimethoxysilane (Z-6020 from Dow Corning) and evaluated for water stain blocking. The polymer composition is 51.5 BA/46.0 MMA/2.5 MAA/0–5% adhesion promoter.

The samples were prepared by adding first adding and mixing 2% Triton® X-405 surfactant, based on solids on latex solids, to the polymer sample. Then 3% aminoethylaminopropyltrimethoxysilane, based on active ingredient on latex solids, (0% for the control) was added to the mixture and allowed to equilibrate overnight.

A cigarette/nicotine stain solution was prepared by extracting nicotine and smoke residue from 30 cigarettes in an alcohol solution. The stain solution was applied to a white vinyl chart and allowed to dry for one week. The severity of the stain was controlled by the number of castings of stain solution on the white vinyl chart.

One coat (7.0 mils draw down) of the mixture of polymer and organosilane was applied to a the stained chart and allowed to dry for two hours. One coat (7.0 mil draw down) of an interior flat wall paint was then applied on top of the first coat and allowed to dry for 24 hours. The test panels were rated for nicotine and smoke stain blocking on a scale of 0–10 where 10=best, by three individuals and averaged.

| Sample ID | Description | Moderate Nicotine Stain | Severe Nicotine Stain |
|---|---|---|---|
| A | Control 0% organosilane | 8.8 | 5.5 |
| B | 3% Z-6020 | 10 | 9.8 |

The addition of aminoethylaminopropyltrimethoxysilane (Z-6020) improved nicotine and smoke stain blocking as compared to the control.

We claim:

1. A method comprising applying to a substrate a coating comprising:
   (a) an acid-functional polymer formed from about 0.1% by weight to about 20% by weight, based on the total weight of said polymer, of at least one acid-functional monomer; and
   (b) about 0.1% by weight to about 20% by weight, based on the weight of said acid-functional polymer, of at least one organosilane having a number average molecular weight of from about 100 to about 10,000.

2. The method of claim 1 wherein said organosilane is a compound selected from the group consisting of aminosilane, epoxysilane, mercaptosilane, vinylsilane, and methacryloxysilane.

3. The method of claim 2 wherein said amino-functional silane is a compound selected from the group consisting of aminoethylaminopropylmethyldimethoxy-silane, aminoethylaminopropyltrimethoxysilane, aminopropylmethyldimethoxysilane, aminopropyltrimethoxysilane, polyaminoalkyl-silicone, aminoethylaminoethylaminopropyltrimethoxysilane, N-(beta-aminoethyl)gammamethylaminopropyl-trimethoxy-silane, trimethoxysilypropyldiethylenetriamine and N-methylaminopropyltrimethoxysilane.

4. The method of claim 3 wherein said amino-functional silane is aminoethylaminopropyltrimethoxysilane.

5. A coated substrate comprising:
   (a) a substrate containing tannin; and
   (b) a coating on said substrate containing
       (i) an acid-functional polymer formed from about 0.1% by weight to about 20% by weight, based on the total weight of said polymer, of at least one acid-functional monomer and
       (ii) about 0.1% by weight to about 20% by weight, based on the weight of said acid-functional polymer, of at least one organosilane having a number average molecular weight of from about 100 to about 10,000.

6. The coated substrate of claim 5 wherein said substrate containing tannin is a material selected from the group consisting of wood, paper, cardboard, plywood, particle board, chip board, and strand board.

7. The coated substrate of claim 6 wherein said wood substrate containing tannin is a wood selected from the group consisting of redwood, cedar, white pine, yellow pine and oak.

* * * * *